3,775,532
REMOVAL OF SULFUR DIOXIDE FROM
GAS STREAMS
Indravadan S. Shah, Forest Hills, N.Y., assignor to Chemical Construction Corporation, New York, N.Y.
Filed Feb. 18, 1972, Ser. No. 227,441
Int. Cl. C01b 17/10
U.S. Cl. 423—242       10 Claims

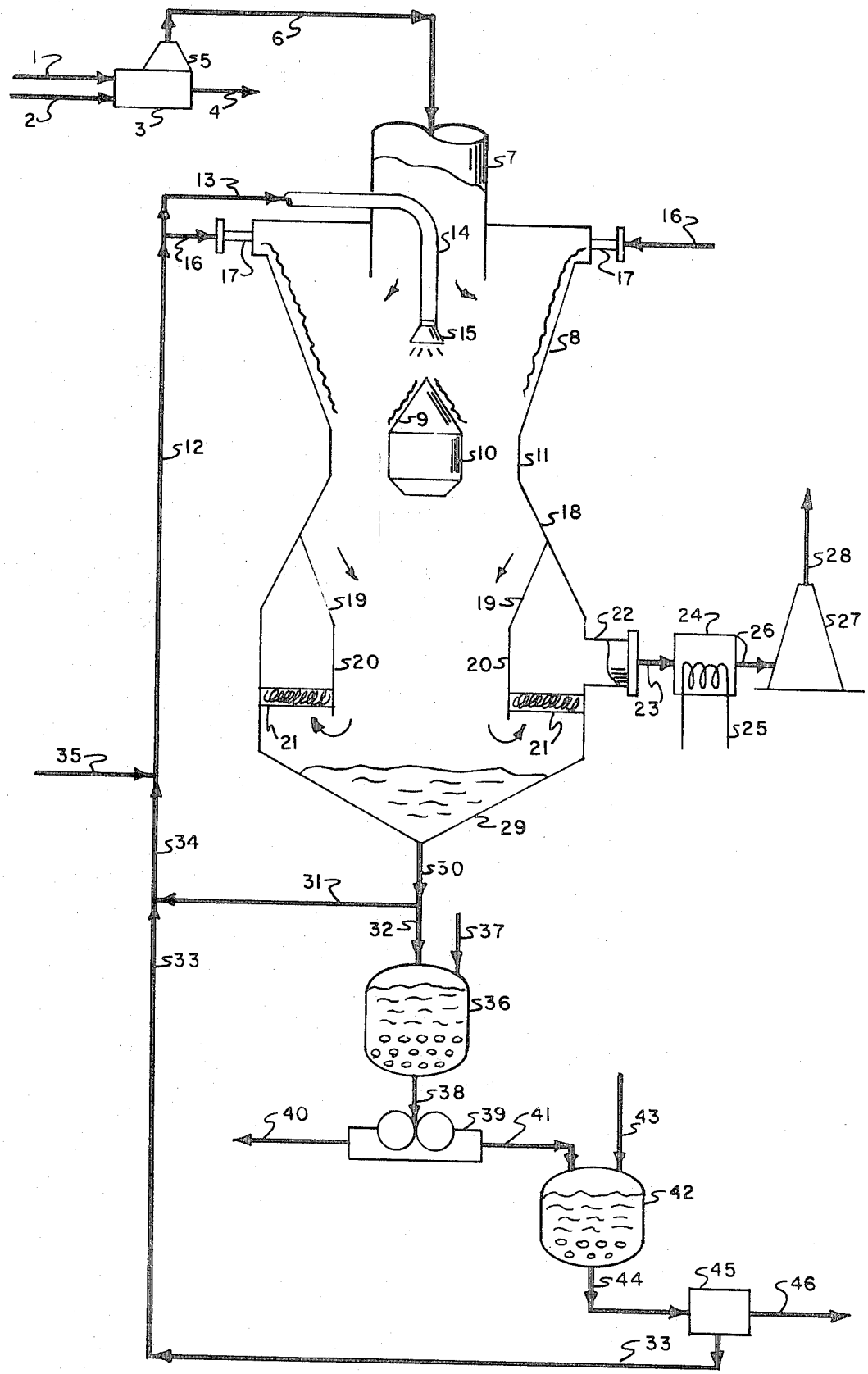

ABSTRACT OF THE DISCLOSURE

Sulfur dioxide is removed from a gas stream such as the waste gas generated by fuel combustion, by scrubbing the gas stream with a circulating aqueous solution containing dissolved sodium sulfite, so that a portion of the sodium sulfite is converted to sodium bisulfite. A bleed stream is withdrawn from the circulating solution and reacted with calcium carbonate to produce precipitated solid calcium sulfite, which is filtered off. At least a portion of the solution is then reacted with calcium oxide to precipitate solid calcium sulfate and thereby prevent a buildup of sulfate in the system. The sulfate is originally formed due to in situ oxidation of sulfite. The calcium sulfate is filtered from the remaining solution, which is returned to the gas scrubbing operation.

BACKGROUND OF THE INVENTION

Field of the invention

The invention relates to the removal of sulfur dioxide from a gas stream such as a waste flue gas derived from the combustion of a sulfur-containing carbonaceous or hydrocarbon fuel, or the tail gas from a sulfuric acid production process, before the waste gas stream is released to the atmosphere, so as to prevent air pollution. The invention is particularly applicable to the removal of sulfur dioxide from the waste gases of power plants, steam generators, space heating boilers and chemical plants such as metallurgical smelters, sulfuric acid production facilities and organic sulfonation processes.

Description of the prior art

Numerous procedures and systems have been proposed or developed for the removal of sulfur dioxide from a waste gas stream employing aqueous alkaline solution for this purpose. Typical prior art procedures employing aqueous sodium sulfite solution include U.S. Pats. Nos. 3,607,-033; 3,600,131; 3,542,511 and 2,161,056. A procedure for removing excess sulfate from a scrubbing solution using a highly acidified solution saturated with sulfur dioxide, to which calcium hydroxide is added, is described in U.S. Pat. No. 2,082,006. Other typical prior art procedures employing aqueous alkali sulfite solutions include U.S. Pat. Nos. 3,617,212; 3,607,001; 3,533,748; 3,085,858; 2,413,321; 2,375,786 and 2,210,405.

SUMMARY OF THE INVENTION

In the present invention, the buildup of sodium sulfate concentration due to in situ oxidation of sulfite in a circulating aqueous sodium sulfite solution employed to remove sulfur dioxide from a gas stream is effectively prevented, by a two-stage precipitation procedure. A bleed stream from the circulating aqueous sodium sulfite solution is reacted with calcium carbonate to precipitate solid calcium sulfite and regenerate the solution. The solid calcium carbonate is usually added in excess so that the solution is in equilibrium with solid calcium carbonate. The solid calcium sulfite phase is separated from the partially treated solution, and this solid phase may be discarded or utilized as desired. In some instances the solid calcium sulfite phase may be roasted or calcined to generate a sulfur dioxide-rich gas stream which is processed to produce a valuable sulfur containing product, and calcium oxide.

The partially treated solution is reacted with calcium oxide, to form solid calcium sulfate and thus eliminate sulfate from the system. In addition, an additional proportion of calcium sulfite may also be precipitated by the lime addition. In most instances, less than the stoichiometric proportion of lime or calcium oxide will be employed for sulfate precipitation, and the lime may be added as hydrated calcium hydroxide or as an aqueous lime slurry. It will be understood that reference to calcium oxide encompasses and includes the usage of hydrated calcium oxide, in the form of hydrated or slaked lime or an aqueous slurry.

The precipitated solid calcium sulfate is separated from the final regenerated solution, which is now depleted or essentially devoid of sulfate content and consists essentially of an aqueous sodium sulfite solution, which may also contain dissolved sodium carbonate and/or sodium hydroxide. The final regenerated solution is added to the circulating aqueous scrubbing solution to maintain sulfite concentration, and additional sodium sulfite and/or sodium carbonate may also be added to the circulating solution for makeup to compensate for losses.

The principal advantage of the present invention is that sulfate buildup in the circulating aqueous sodium sulfite solution is prevented in an efficient and economical manner. Another advantage is that inexpensive materials are employed to regenerate the aqueous sodium sulfite solution. A further advantage is that the bleed stream from the circulating aqueous sodium sulfite solution is completely regenerated. An advantage is that an improved and more efficient process for the removal of sulfur dioxide from a gas stream by scrubbing with aqueous sodium sulfite solution is provided.

It is an object of the present invention to provide an improved process for the removal of sulfur dioxide from a gas stream employing aqueous sodium sulfite solution.

Another object is to prevent air pollution due to the emission of sulfur dioxide in waste gas streams discharged to the atmosphere.

An additional object is to prevent the buildup or increase of sodium sulfate concentration in a circulating aqueous sodium sulfite solution employed to scrub sulfur dioxide from a gas stream.

A further object is to remove sulfur dioxide from a gas stream in an improved manner.

Still another object is to provide an improved two-stage process for the regeneration of aqueous sodium sulfite solution employed to scrub sulfur dioxide from a gas stream, in which calcium carbonate is employed in the first stage to convert bisulfite to sulfite and calcium oxide is employed in the second stage to precipitate and thereby remove sulfate from the solution.

These and other objects and advantages of the present invention will become evident from the description which follows:

DESCRIPTION OF THE DRAWING AND PREFERRED EMBODIMENTS

Referring now to the drawing, a flowsheet of a preferred embodiment of the invention is presented. Fuel stream 1, which contains a small proportion of sulfur and which is typically a solid carbonaceous fuel such as coal or a liquid hydrocarbon fuel such as crude oil, fuel oil or residual oil from petroleum refining, is passed together with combustion air stream 2 into furnace or steam boiler 3, in which the fuel stream 1 is burned to generate heat, which vaporizes water to produce usable steam which may be employed to generate electrical power. The combustion of stream 1 also usually produces a solid ash which is removed via stream 4. In addition, the combustion of stream 1 also produces a flue gas stream which is removed from unit 3 via transfer duct or stack 5 as stream 6, which is now processed in accordance with the present invention.

Stream 6 is a combustion flue gas which is typically produced at a temperature in the range of 80° C. to 200° C., and stream 6 will typically contain in the range of 0.01% to 2% sulfur dioxide as well as entrained solid fly ash particles. Stream 6 is passed downwards through vertically oriented conduit 7 for contact with an aqueous sodium sulfite scrubbing solution in a gas-liquid contactor, which in this embodiment of the invention is an annular venturi scrubber having a converging section defined by the inverted frustoconical baffle 8 and central conical baffle 9, and an annular throat section defined by the inner cylindrical baffle 10 which depends from the base of baffle 9 and outer cylindrical baffle 11 which depends from the lower terminous of baffle 8. Stream 6 is accelerated to a high velocity in flowing downwards into the annular venturi passage.

A scrubbing liquid stream 12 is employed to scrub the gas stream in the annular venturi scrubber. Stream 12 consists essentially of an aqueous sodium sulfite solution, and stream 12 may also contain a small proportion of dissolved sodium bisulfite or sodium carbonate, as well as entrained solid particles such as fly ash. A portion of stream 12 flows via stream 13 through pipe 14 and is discharged via spray nozzle 15 onto the apex of the conical baffle 9, so that the stream 13 flows downwards on the outer surface of baffle 9. Stream 13 will usually be in the range of 25% to 75% of stream 12.

The balance of stream 12 flows via streams 16 to nozzles 17, which discharge streams 16 onto an annular shelf so that scrubbing liquid flows uniformly downwards on the inner surface of baffle 8. In a preferred embodiment, nozzle 17 may be oriented substantially tangential to baffle 8 so that the streams 16 are discharged in tandem from nozzles 17 and flow downwards on baffle 8 in a whirling circular flow path.

The scrubbing liquid flowing downwards on the inner surface of baffle 8 and the outer surface of conical baffle 9 is projected into the high velocity gas stream in the annular throat section defined between baffles 10 and 11, and the liquid solution is dispersed into small droplets which uniformly and thoroughly scrub the gas stream. A major portion or essentially all of the sulfur dioxide component is absorbed from the gas stream into the liquid solution, with resultant reaction with sodium sulfite and formation of sodium bisulfite, which may react at least in part with dissolved sodium carbonate to form further sodium sulfite. In addition, a major portion or essentially all of the solid fly ash particles originally present in stream 6 are wetted and entrained into the liquid droplets phase in the annular venturi throat section.

The resultant mixture of liquid droplets and scrubbed gas now flows downwards from the annular throat section between baffles 10 and 11 and through a pressure regain section defined by the frustoconical baffle 18, which is provided to prevent turbulence and thus attain uniform gas flow which minimizes gas pressure drop.

The gas mixture next flows through the converging inverted frustoconical baffle 19 and downwards through cylindrical baffle 20. The direction of gas flow reverses below the lower terminus of baffle 20, and the gas flows upwards through an annular passage external to baffle 20 which is provided with entrainment separator 21, which is typically a wire mesh, packed bed, plurality of staggered slats or other suitable device for separating entrained liquid droplets from the scrubbed gas stream. The scrubbed and essentially liquid-free gas stream rising from entrainment separation means or device 21 now flows through outlet duct 22 as stream 23, which passes into reheater 24 which reheats the scrubbed gas stream to a suitable temperature to assure adequate dispersion to the atmosphere. A suitable heating fluid such as steam is circulated through the heating coil or circuit 25 which extends into unit 24. In some instances, a portion or all of stream 6 may be circulated through unit 24 via member 25 to attain heating of the scrubbed gas stream, prior to passing streams 6 into conduit 7. The reheated scrubbed gas stream is discharged from unit 24 via stream 26, which passes to stack 27 for discharge to the atmosphere via stream 28. Due to the processing described supra, stream 28 is discharged to the atmosphere without causing air pollution.

Returning now to the venturi scrubber, the scrubbing liquid which has been separated from the scrubbed gas stream collects in the lower portion of the unit defined by the lower inverted conical baffle 29. The spent scrubbing liquid is withdrawn from the lower apex of baffle 29 via stream 30, which is now divided into primary recycle stream 31 and bleed stream 32 which is processed in accordance with the present invention as will appear infra.

Stream 31 is now recycled for further gas scrubbing after addition of suitable makeup streams. Regenerated aqueous solution stream 33 containing dissolved sodium sulfite and produced according to the present invention is added to stream 31 to form stream 34. Makeup sodium carbonate or sodium sulfite or both are added to stream 34 via stream 35, which may in practice consist of a solid sodium salt or an aqueous sodium salt slurry or solution. The addition of stream 35 to stream 34 produces stream 12, which is utilized in gas scrubbing as described supra.

The bleed stream 32, which typically consists of on the order of 1% to about 15% of stream 30, is now processed in accordance with the present invention. Stream 32 is passed into reaction tank 36 and is reacted with solid particulate calcium carbonate reactant stream 37 which is also admitted into tank 36, which may be provided with a suitable stirrer or agitator or the like to attain uniform mixing and reaction of the solid and liquid phases. The reaction of stream 32 with stream 37, which is typically 200 mesh limestone, serves to convert any sodium bisulfite derived from stream 32 into sodium sulfite, with the concomitant prepicitation of solid calcium sulfite. In addition, a portion of the sodium sulfite present and derived from stream 32 may be converted to sodium carbonate, with concomitant further precipitation of calcium sulfite. In any case, stream 37 reacts with stream 32 in tank 36 and solid calcium sulfite is precipitated. In most instances, an excess of solid calcium carbonate will be present in tank 36, so that the solid phase in tank 36 at equilibrium principally consists of calcium sulfite, residual calcium carbonate and fly ash.

An aqueous slurry is removed from tank 36 via stream 38, which flows to solids-liquid separation means 39, which typically consists of a vacuum drum filter, a plate and frame filter or other type of filter, or in some cases unit 39 may consist of a centrifuge or other suitable means for separating entrained solids from a liquid phase. The separated solid phase is removed from unit 39 via stream 40, which now principally consists of calcium sulfite, calcium carbonate and fly ash particles. Stream 40 may be discarded or passed to suitable waste disposal, however in some cases stream 40 may be roasted or calcined or heated in any suitable manner and device, preferably together with added solid carbonaceous material, in order to evolve a sulfur dioxide-rich gas stream and produce solid calcium oxide. The sulfur doxide-rich gas stream may be processed in any suitable manner to produce a valuable sulfur-containing product, thus the evolved gas stream may be refrigerated and/or compressed, in order to condense product liquid sulfur dioxide. In other instances, the evolved gas stream may be passed to a sulfuric acid production facility, especially when stream 6 is derived from such a facility. A portion of the calcium oxide-rich solids phase produced by the heating of stream 40 may be further employed within the process as will appear infra.

The clear liquid phase produced by unit 39 is removed via stream 41, which consists essentially of an aqueous sodium sulfite solution, usually containing a small proportion of sodium bisulfite or sodium carbonate, as well as a small proportion of sodium sulfate derived from in situ oxidation of sodium sulfite during the gas scrubbing procedure described supra. In some instances, such as when stream 6 is the tail gas from a sulfuric acid production facility, stream 6 will originally contain sulfur trioxide which is absorbed into the liquid phase during gas scrubbing to directly form sodium sulfate. In any case, stream 41 will contain a viable proportion of sodium sulfate which must be at least partially eliminated in order to prevent the buildup of sulfate concentration in the system, which could result if stream 41 was directly recycled to gas scrubbing.

Stream 41 is therefore passed into reaction tank 42 and reacted with added calcium oxide stream 43, which preferably consists of solid calcium oxide or hydrated calcium oxide in the form of calcium hydroxide, which may in actuality be present in an aqueous slurry or solution. In any event, the term calcium oxide will be understood to encompass and include various forms of calcium oxide including the hydrated calcium hydroxide alternatives. Stream 43 reacts with stream 41 within unit 42, thereby raising the pH of the aqueous phase and producing a precipitation of at least a portion of the sulfate as solid calcium sulfate.

In addition, a small proportion of solid calcium sulfite may also be precipitated in unit 42. The resulting aqueous slurry formed in unit 42 is removed via stream 44, which passes to a solids-liquid separation means 45 which is typically a filter or centrifuge similar to unit 39 described supra. The separated solids phase is removed from unit 45 via stream 46, which principally consists of sodium sulfate and which is discarded or passed to waste disposal. The clear liquid phase produced by unit 45, consisting essentially of an aqueous sodium sulfite solution of depleted sulfate content, is recycled via stream 33 as described supra. Stream 33 will be essentailly devoid of sulfate in some instances, and stream 33 may also contain a minor proportion of sodium hydroxide.

Numerous alternatives within the scope of the present invention, besides those alternatives mentioned supra, will occur to those skilled in the art. Stream 6 may be derived from any suitable alternative source of a gas stream containing sulfur dioxide, thus stream 6 may be the waste tail gas from a chemical or metallurgical facility such as a sulfuric acid production facility, a smelter or the like. Stream 6 may be scrubbed with stream 12 in any suitable gas-liquid contact device or means, such as an alternative type of venturi contactor, a turbulent contact absorber, a packed tower, a spray tower or the like. Streams 6 and 12 may be contacted in a plurality of stages with countercurrent flow of gas and liquid between and through the stages. Only a portion of stream 41 may be passed into tank 42 for reaction with stream 43, with the balance of stream 41 being added directly to stream 33 for recycle.

Stream 44 may be combined with stream 38, or separately added to filter 39. In this case, stream 41 would be divided into two portions, with one portion passing to tank 42 and the second portion being recycled via stream 33. Finally, in practice of the invention stream 38 will usually be initially passed to a thickener or the like, from which the underflow will pass to unit 39 with the overflow being added to stream 41.

An example of an application of the present invention to a typical commercial facility will now be described.

EXAMPLE

The invention was applied to the prevention of air pollution from a coal-burning steam power plant which generated a flue gas containing sulfur dioxide and fly ash. Following is data relative to principal process streams.

| Stream No. | Component | Flow rate or percent by weight of component | Temp., °C. |
|---|---|---|---|
| 6 | Total stream | 12,450 actual cubic meters per minute. | 150 |
| 6 | Sulfur dioxide | 31.7 kg./min | |
| 6 | Fly ash | 122.3 kg./min | |
| 12 | Total stream | 66,500 liters per minute | 50 |
| 12 | Sodium sulfite | 11 percent | |
| 12 | Sodium bisulfite | 3.8 percent | |
| 12 | Sodium sulfate | 10 percent | |
| 13 | Total stream | 33,250 liters per minute | |
| 23 | do | 9,710 actual cubic meters per minute. | 50 |
| 23 | Sulfur dioxide | 1.58 kg./min | |
| 23 | Fly ash | 1.22 kg./min | |
| 32 | Total stream | 663 liters | 50 |
| 37 | do | 50 kg./min | |
| 40 | do | 272 kg./min | |
| 40 | Calcium sulfite | 77 kg./min | |
| 40 | Fly ash | 121 kg./min | |
| 40 | Water | 45 kg./min | |
| 43 | Total stream (hydrated lime). | 9.1 kg./min | |
| 46 | Total stream | 16 kg./min | |

I claim:

1. A process for the removal of sulfur dioxide from a gas stream which comprises scrubbing a gas stream containing sulfur dioxide with an aqueous scrubbing solution containing sodium sulfite, whereby sulfur dioxide is absorbed into said aqueous solution and reacts with a portion of the dissolved sodium sulfite to form sodium bisulfite, dividing the resulting aqueous sodium sulfite-bisulfite solution into a first portion and a second portion, said second portion being about 1% to 15% of the total amount of said resulting aqueous sodium sulfite-bisulfite solution, adding a sodium compound selected from the group consisting of sodium sulfite and sodium carbonate to said first solution portion, recycling the resulting first solution portion for further gas scrubbing, adding calcium carbonate to said second solution portion, whereby solid calcium sulfite is precipitated, separating said solid calcium sulfite from the residual second solution portion, adding calcium oxide to at least a portion of said residual second solution portion, whereby solid calcium sulfate is precipitated, separating said solid calcium sulfate from the final second solution portion, and adding said final second solution portion to said aqueous scrubbing solution.

2. The process of claim 1, in which said gas stream contains entrained solid particles, and at least a portion of said entrained solid particles are removed from said gas stream in said resulting aqueous sodium sulfite-bisulfite solution.

3. The process of claim 2, in which said gas stream is a waste gas stream produced by the combustion of fuel, and said entrained solid particles consist of fly ash.

4. The process of claim 1, in which dissolved sodium carbonate is formed in said second solution portion upon addition of said calcium carbonate.

5. The process of claim 1, in which said aqueous scrubbing solution contains dissolved sodium carbonate.

6. The process of claim 1, in which calcium carbonate is added to said second solution portion in excess of the stoichiometric proportion for reaction and precipitation of solid calcium sulfite, whereby said solid calcium sulfite is separated together with residual solid calcium carbonate.

7. The process of claim 1, in which the proportion of calcium oxide added to said residual second solution portion is less than the stoichiometric proportion for complete reaction with dissolved compounds in said residual second solution portion.

8. The process of claim 1, in which said calcium oxide is added in the form of hydrated calcium hydroxide.

9. The process of claim 1, in which said gas stream is scrubbed with said aqueous scrubbing solution in a vertically oriented venturi gas scrubber, said gas stream being passed downwards through said venturi scrubber.

10. The process of claim 9, in which said venturi gas scrubber is an annular venturi provided with a central conical flow diversion baffle, a first portion of said aqueous scrubbing solution is passed downwards on the surface of said baffle, and a second portion of said aqueous scrubbing solution is passed downwards on the surface of the upper converging section of said venturi passage.

References Cited
UNITED STATES PATENTS

| | | | |
|---|---|---|---|
| 3,542,511 | 11/1970 | Shah | 423—242 X |
| 2,090,143 | 8/1937 | Nonhebel | 423—242 |
| 2,073,039 | 3/1937 | Wilton et al. | 423—242 |

EARL C. THOMAS, Primary Examiner

G. A. HELLER, Assistant Examiner

U.S. Cl. X.R.

423—541